(12) United States Patent
Schmeisser

(10) Patent No.: US 8,176,672 B1
(45) Date of Patent: May 15, 2012

(54) ICE FISHING SIGNALING DEVICE

(76) Inventor: Donald Leonard Schmeisser, Abrams, WI (US)

(*) Notice: Subject to any disclaimer, the term of this patent is extended or adjusted under 35 U.S.C. 154(b) by 0 days.

(21) Appl. No.: 13/269,616

(22) Filed: Oct. 9, 2011

(51) Int. Cl.
*A01K 85/01* (2006.01)
(52) U.S. Cl. .............................................. 43/17; 43/16
(58) Field of Classification Search ................. 43/17, 16, 43/4.5
See application file for complete search history.

(56) References Cited

U.S. PATENT DOCUMENTS

| | | | |
|---|---|---|---|
| 2,448,346 A | | 8/1948 | Battgh et al. |
| 2,618,091 A | * | 11/1952 | Sheraski ........................... 43/17 |
| 3,041,770 A | | 7/1962 | Witfero |
| 3,196,570 A | | 7/1965 | Borisch |
| 3,352,048 A | | 11/1967 | Fleming |
| 3,745,689 A | * | 7/1973 | Williams ........................... 43/17 |
| 3,807,078 A | | 4/1974 | Bartys |
| 4,079,537 A | * | 3/1978 | Chretien ........................... 43/17 |
| 4,373,287 A | | 2/1983 | Grahl |
| 4,837,965 A | | 6/1989 | True |
| 4,845,878 A | * | 7/1989 | Hackel .............................. 43/17 |
| 4,862,627 A | * | 9/1989 | Keller .............................. 43/17 |
| 4,949,497 A | * | 8/1990 | Lindell ............................. 43/17 |
| 4,980,986 A | * | 1/1991 | Harper ............................. 43/17 |
| 5,867,933 A | * | 2/1999 | Walker ........................ 43/43.13 |
| 6,088,945 A | * | 7/2000 | Sanderfoot ......................... 43/4 |
| 6,105,300 A | * | 8/2000 | Abdo ............................... 43/17 |
| 6,564,496 B2 | | 5/2003 | Scherg |
| 7,185,456 B1 | * | 3/2007 | Schoenecker et al. ........... 43/17 |
| 7,316,094 B1 | | 1/2008 | Bishop |
| 7,818,913 B1 | | 10/2010 | Hoglund |
| 2008/0052981 A1 | | 3/2008 | Richardson |

* cited by examiner

*Primary Examiner* — Christopher P Ellis
(74) *Attorney, Agent, or Firm* — Steven H. Greenfield; Greenfield Invention and Patent Consulting, Inc

(57) ABSTRACT

A device for signaling to an ice fisherman that a fish has taken the bait and a method for utilizing the device are disclosed. The device comprises a trigger pivotally attached to a housing. The trigger is balanced horizontally by a fishing line containing a loop adapted for looping and draping over one end of the trigger and one or more balancing and counterbalancing weights. The tugging of a fish taking the bait on the fishing line pulls the line off the trigger which allows the trigger to tip vertically signaling to the fisherman to take action to raise the fishing line.

6 Claims, 8 Drawing Sheets

ICE FISHING SIGNALING DEVICE

FIELD OF THE INVENTION

The present invention relates to a device for signaling to an ice fisherman that a fish has taken the bait so that he or she may then proceed to pull up the fishing line. When a fishing line is lowered into the water through a hole in the ice, the fisherman is disadvantaged by the fact that the movement of fish in the ice is not visible. This makes it difficult for the fisherman to know when a fish has taken the bait that would necessitate action to raise the fishing line. The device of the present invention solves the problem by providing a mechanism for tipping a trigger strip or rod into a vertical position triggered by the fish taking the bait and tugging on the fishing line.

BACKGROUND OF THE INVENTION

A large number of prior art references relating to signaling devices for ice fishing have been identified. Several of the references disclose the pivot bar of the present invention or variations thereof. It is especially evident in U.S. Pat. No. 3,196,570, but also in U.S. Pat. Nos. 4,373,287, 4,837,965, 6,564,496, 7,316,094, and US publication 20080052981. Several additional references were identified that show various tip-up embodiments but do not overlap with the present invention.

SUMMARY OF THE PRESENT INVENTION

In an aspect of the present invention, a device for signaling that a fish has taken bait comprises: a housing containing a top side, a front wall, a rear wall, a first side wall and a second side wall opposite to the first side wall, the top side wall comprising an elongated slot, the slot defining a front elongated side and a rear elongated side; a trigger having a first end and a second end, the trigger being pivotally attached at a center point of the trigger to a center point of the slot rear elongated side, the first end of the trigger containing an aperture, and the second end containing a weight, the weight being sufficient to cause the trigger to tip to a vertical position; and a fishing line woundable onto a spool attached to the top side, the spool being configured for free rotation, the fishing line having an end containing a bait, the fishing line also containing a first counterbalancing weight disposed at a first distance from the end of the fishing line and a second counterbalancing weight disposed at a second distance from the end of the fishing line, the second distance being larger than the first distance, the fishing line containing a loop between the first counterbalancing weight and the second counterbalancing weight, the loop being configured for looping and draping over the first end of the trigger in a manner that the end of the fishing line reaches a desired fishing distance when the trigger is balanced in a horizontal position.

In another aspect of the present invention, a method of utilizing a device for signaling that a fish has taken bait comprises: positioning the device over an opening in an icy area of a river or lake; pivoting the trigger to a horizontal position; draping the loop over the first end of the trigger in such a manner that the trigger is substantially balanced in a horizontal position and the end of the fishing line containing the bait reaches the desired water depth; inserting the flexible support inside the aperture of the first end of the trigger; and positioning the end of the fishing line into the opening in the icy area.

These and other features, aspects and advantages of the present invention will become better understood with reference to the following drawings, descriptions and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention provides a device for signaling to an ice fisherman that a fish has taken the bait so he or she could then raise the line with the fish.

Figure 1:
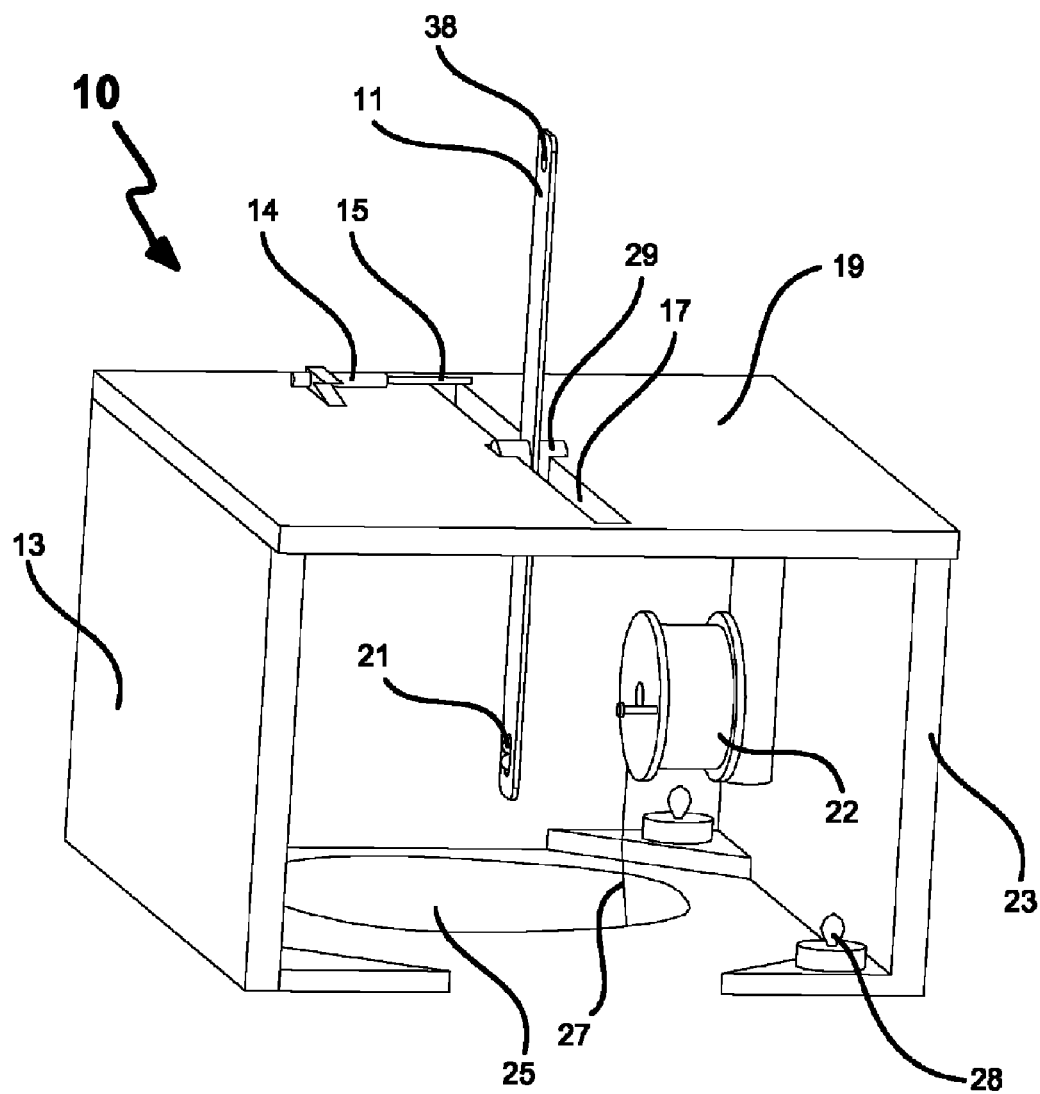
FIG. 1 is a first side cross sectional perspective view of the signaling device according to an embodiment of the present invention.
Figure 2:
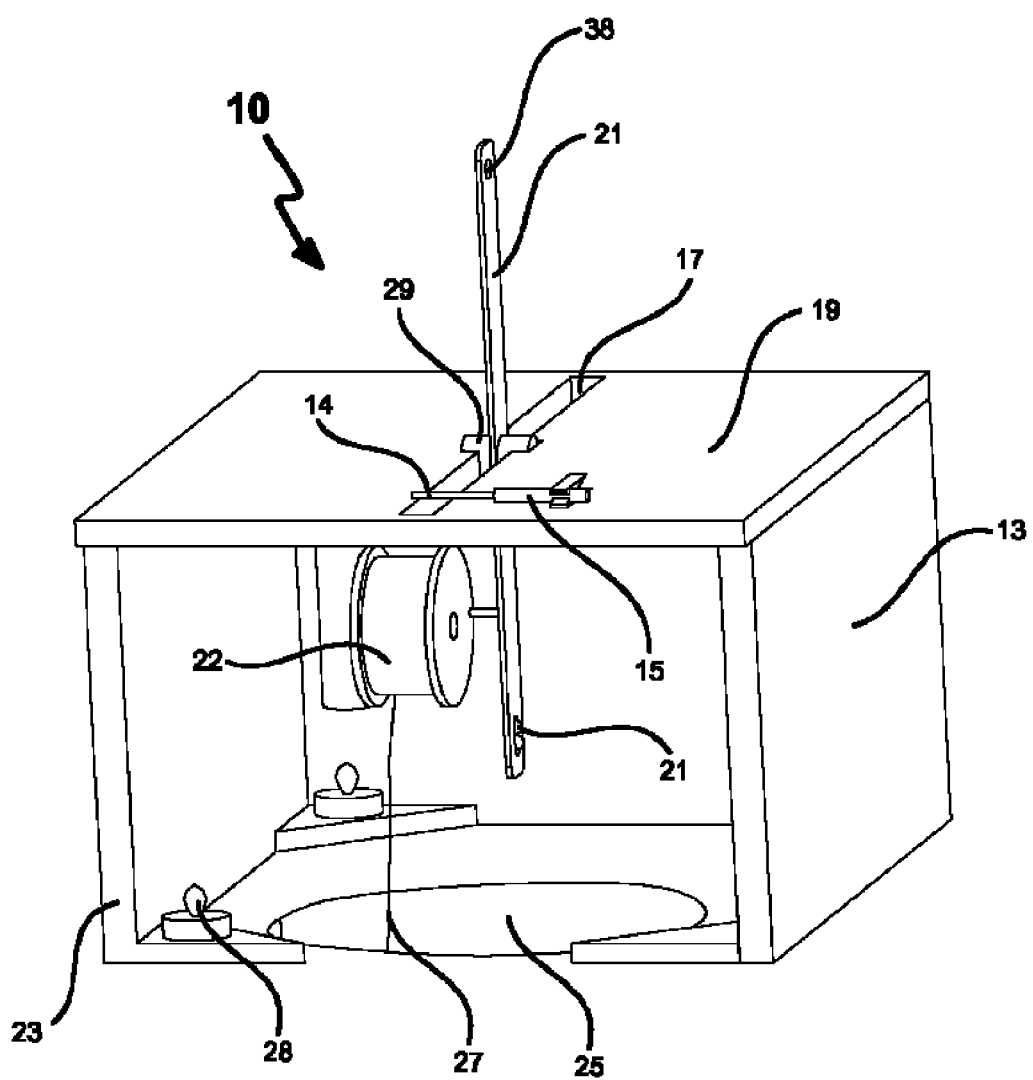
FIG. 2 is a second side cross sectional perspective view of the signaling device according to an embodiment of the present invention.
Figure 3:
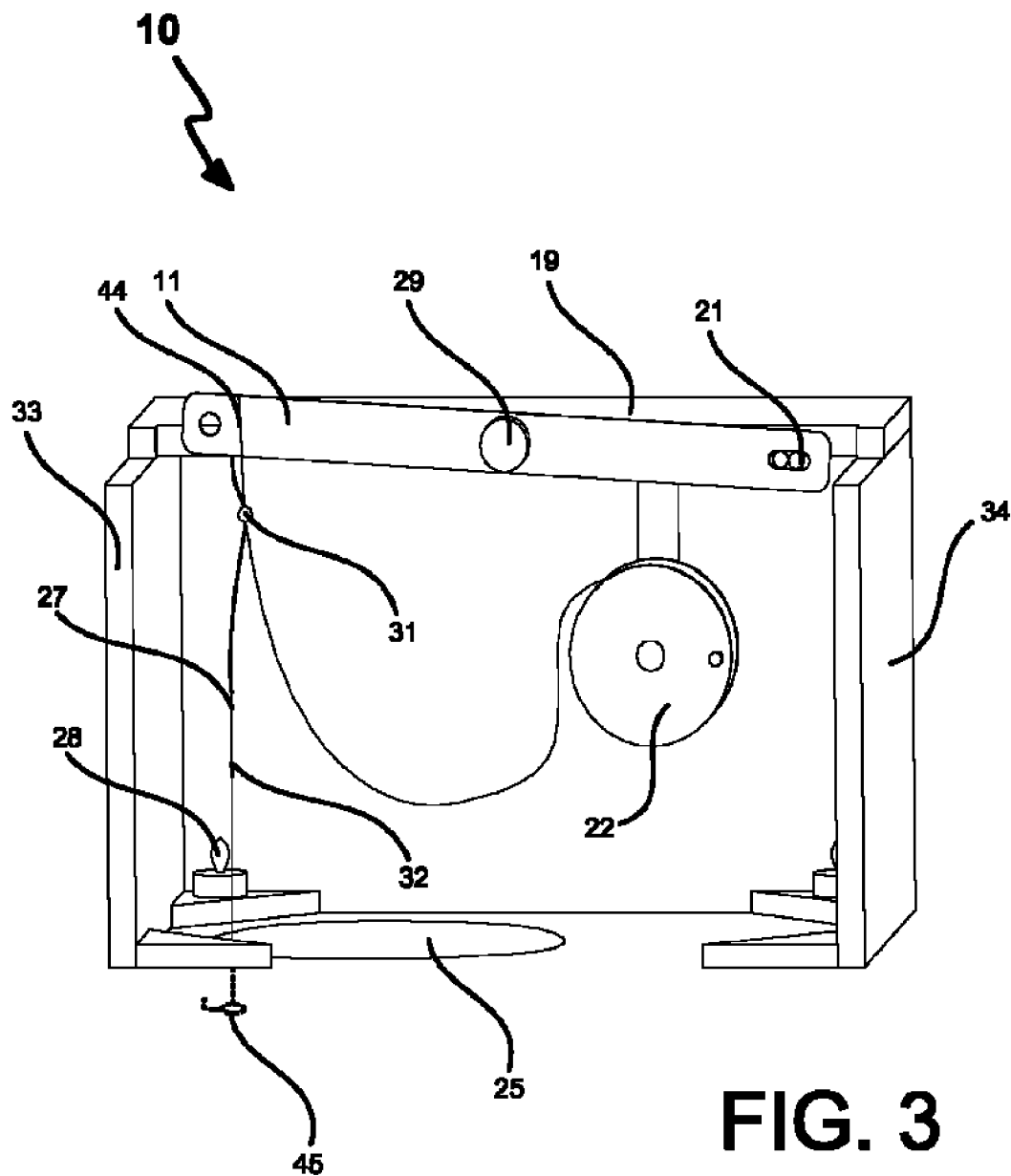
FIG. 3 is a front cross sectional perspective view of the signaling device according to an embodiment of the present invention.
Figure 4:
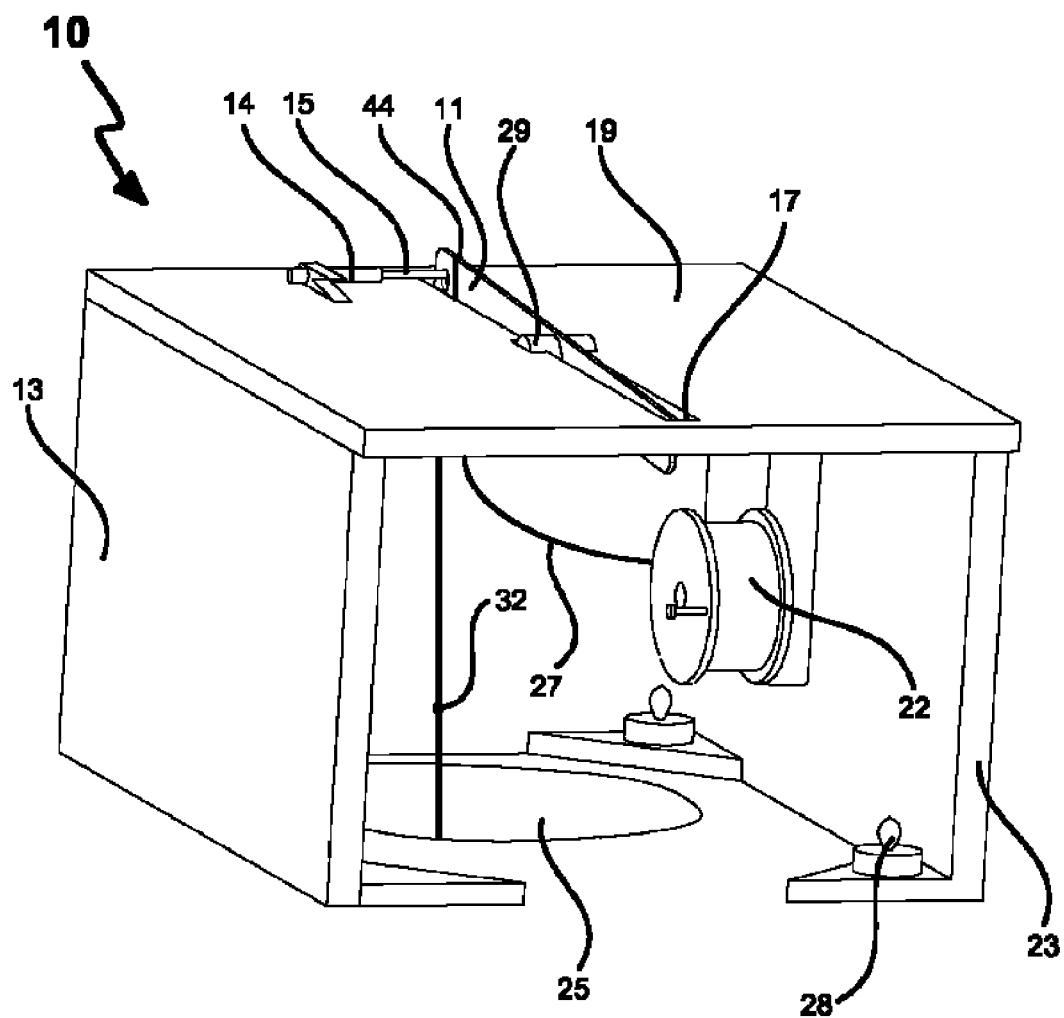
FIG. 4 is another first side cross sectional perspective view of the signaling device according to an embodiment of the present invention.
Figure 5:
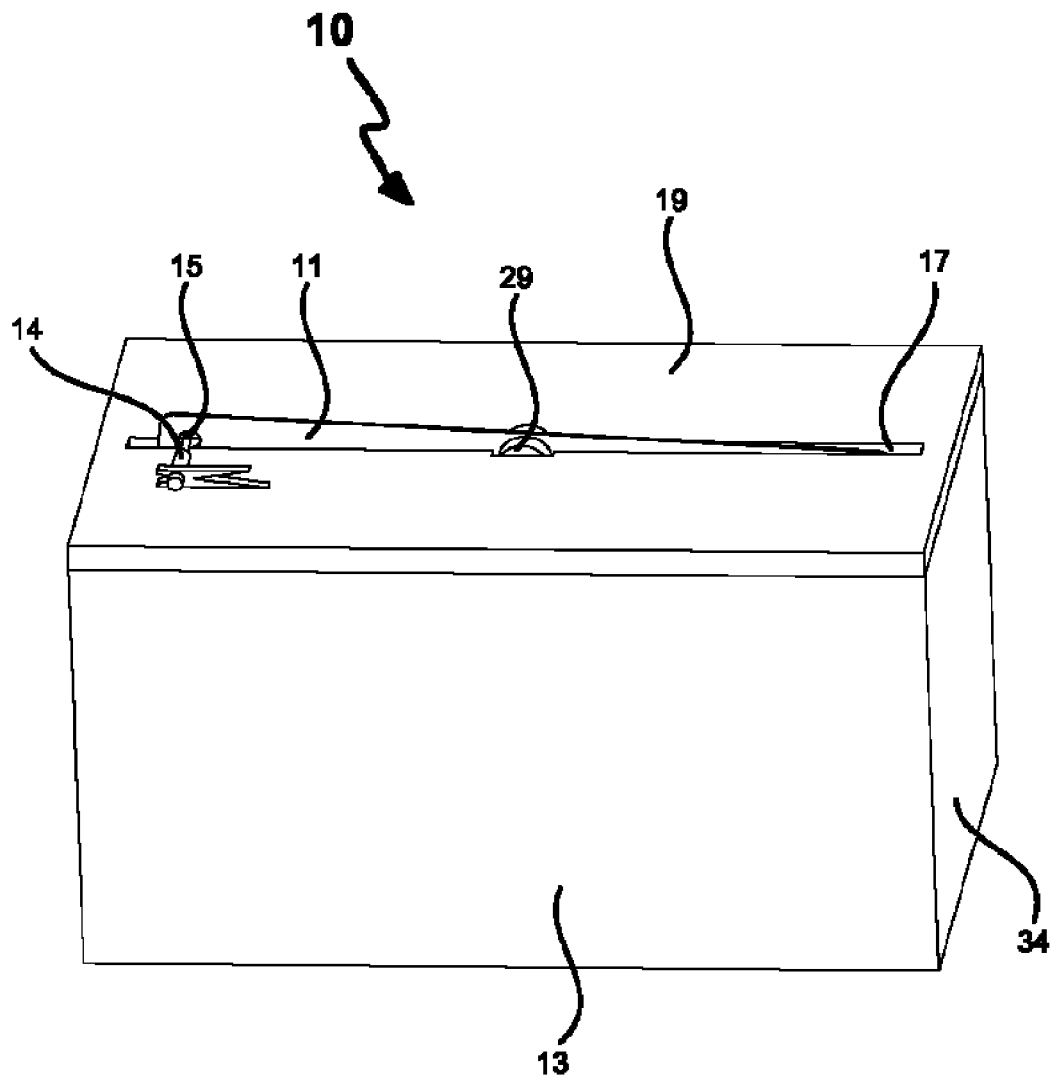
FIG. 5 is a top side perspective view of the signaling device according to an embodiment of the present invention.
Figure 6:
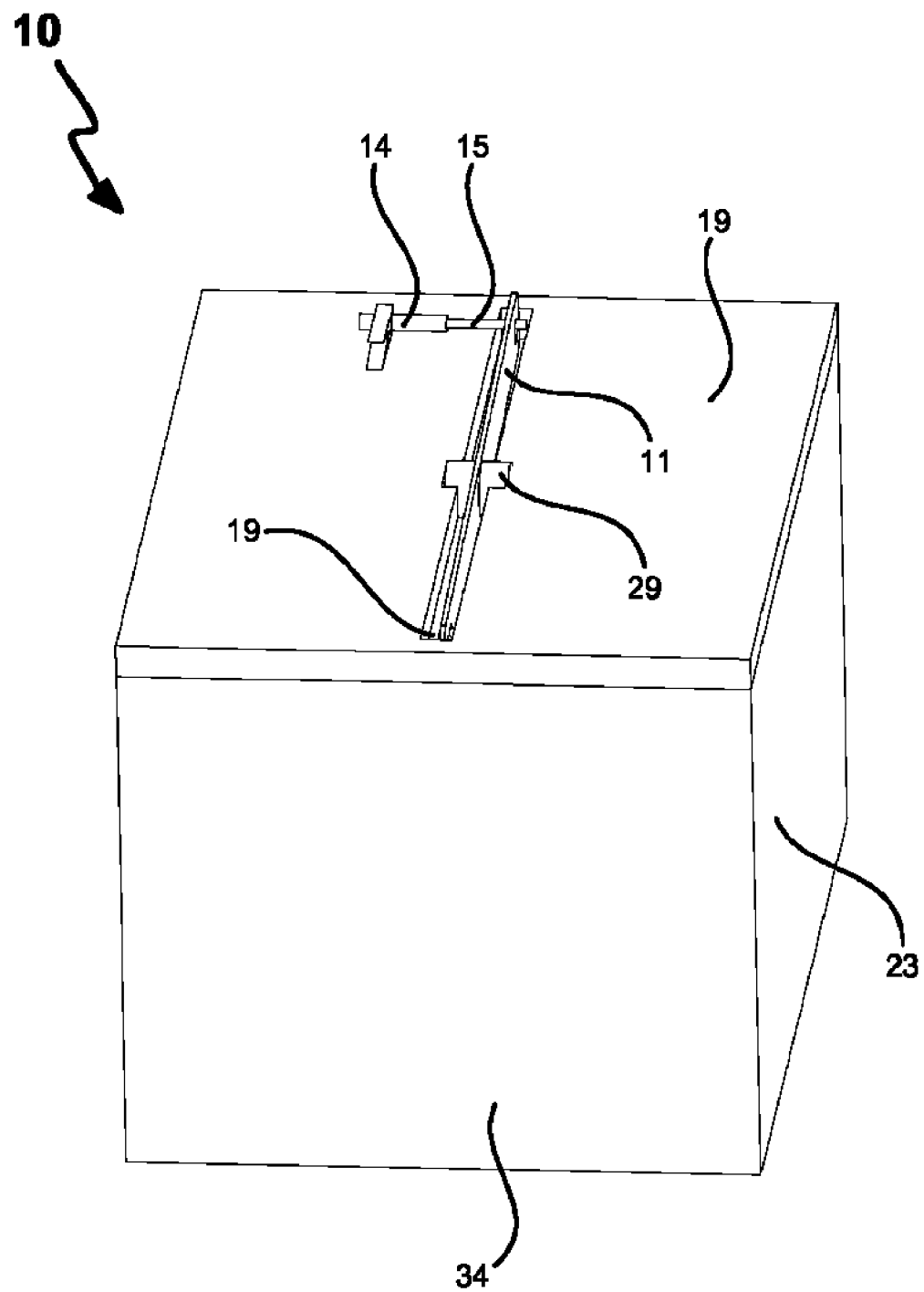
FIG. 6 is another top side perspective view of the signaling device according to an embodiment of the present invention.
Figure 7:
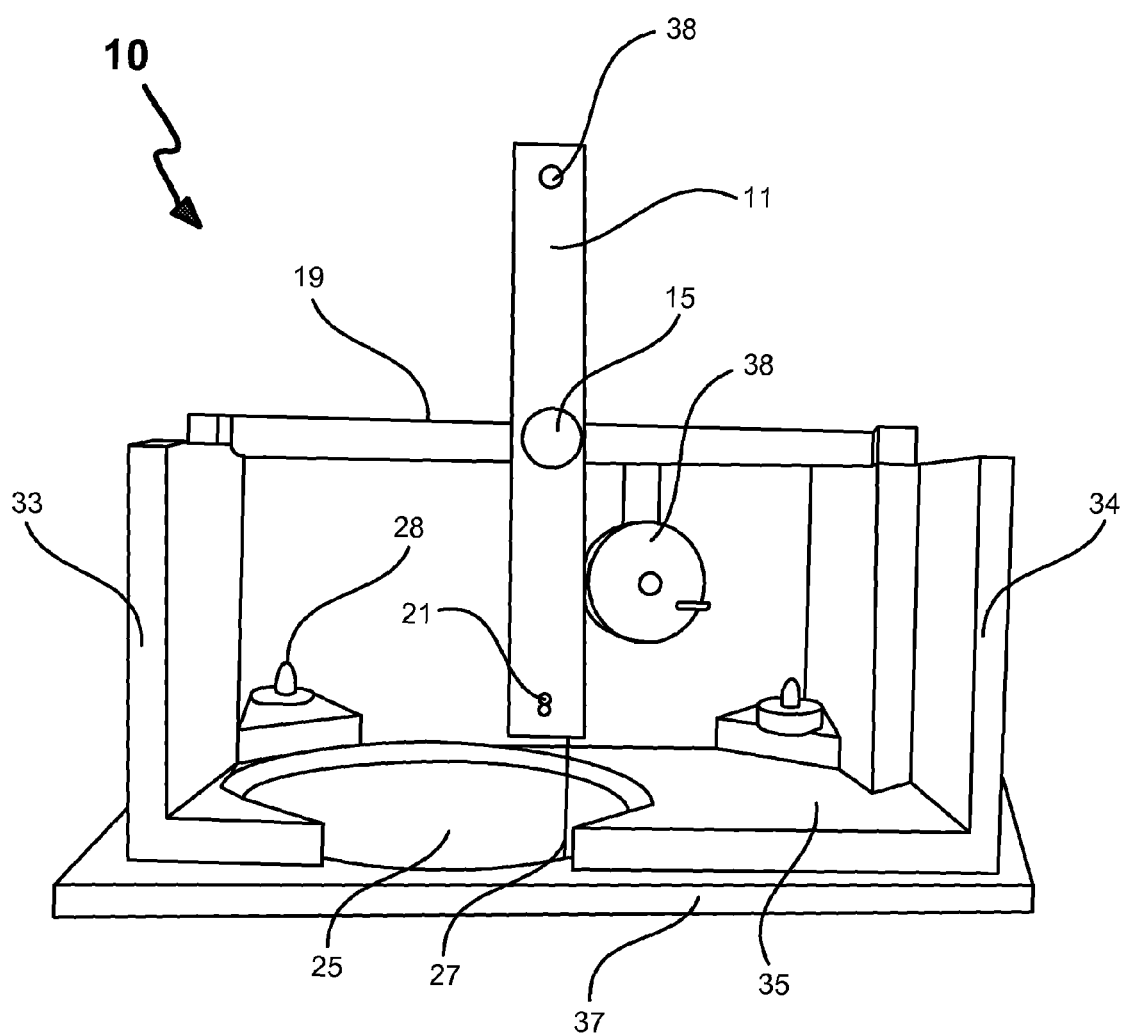
FIG. 7 is another front cross sectional perspective view of the signaling device according to an embodiment of the present invention.
Figure 8:
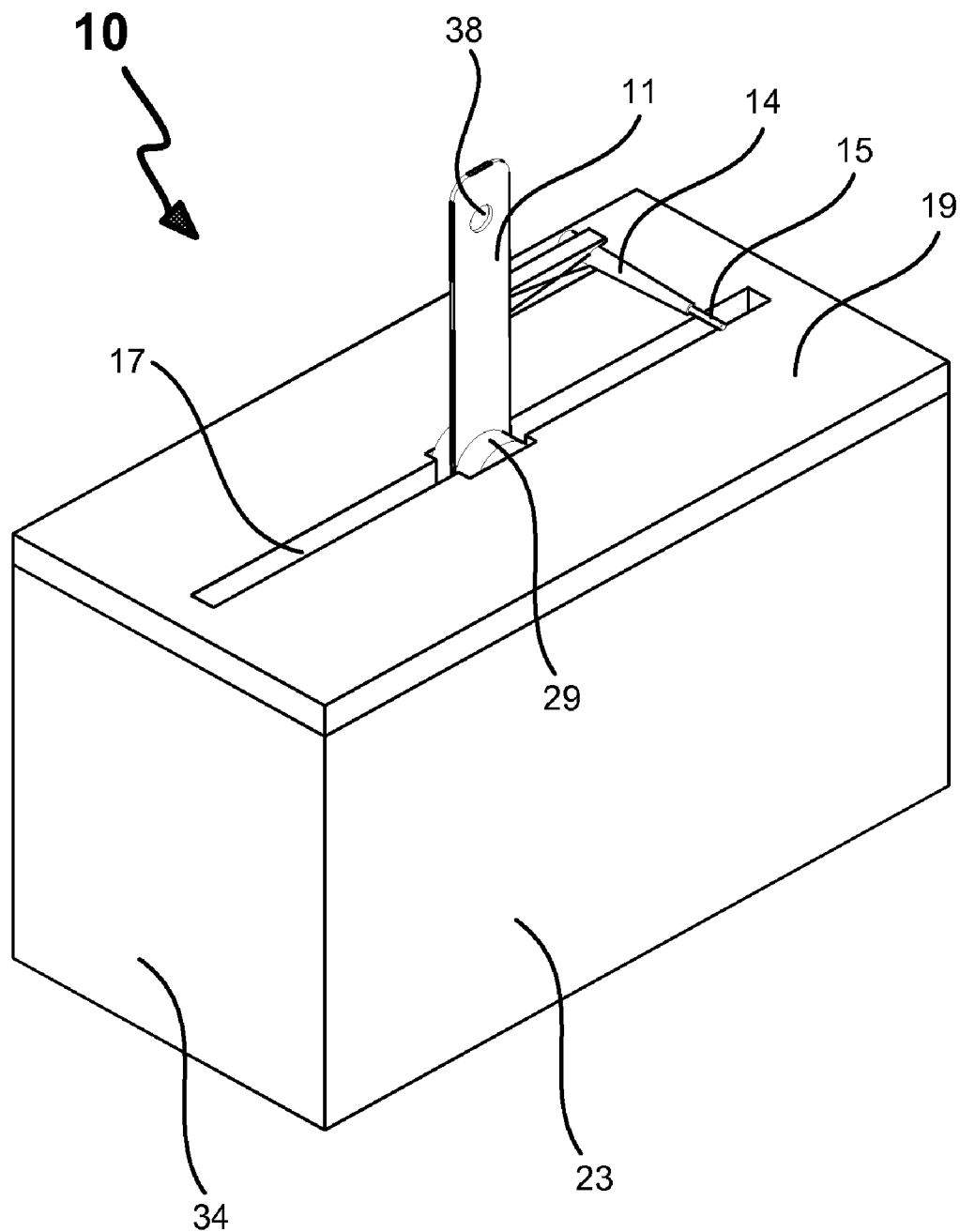
FIG. 8 is another top side perspective view of the signaling device according to an embodiment of the present invention.

The features of the present invention are shown from various angles in FIGS. 1-8. The device 10 for alerting the fisherman that a fish has been caught comprises a housing having a top 19, a front wall 13, a rear wall 23, a first side 33, a second side 34 and optionally a base 35 shown in FIG. 7. If a base is included, it must have an opening that fits over hole 25 in the ice 37 into which a fishing line 27 is lowered. The fishing line 27 is wound onto a spool 22 situated inside the housing and attached to the top 19 of the housing. The top 19 of the housing comprises a slot 17 containing a pivot 29 attached to the rear side of the slot 17.

A trigger 11 is placed into an elongated slot 17 and is attached to the pivot 29 such that the trigger 11 is free to rotate around the pivot 29. The trigger 11 has an aperture 38 at one end and a weight 21 at the other end. The weight 21 forces the trigger 11 into a vertical posture which is the normal position of the trigger 11. The trigger 11 may be a wooden strip, a ruler or a rod. The pivot may comprise an axle or a pin.

The end of the fishing line 27 contains a hook 45 for attaching a bait. The end of the fishing line 27 along with the hook and bait 45 are placed inside an opening 25 in the ice 37 where it awaits for a fish to bite into. The fishing line 27 also contains a loop 44 and two weights 31 and 32. The loop 44 is configured for loosely mounting and draping over the end of the trigger 11 containing aperture 38 when disposed in a horizontal position such that the fishing line 27 below the loop 44 has sufficient length for fishing. The purpose of weights 31 and 32 is to provide counterbalancing weights to weight 21 such that trigger 11 is balanced in a substantially horizontal position. Thus the sum of weights 31, 32 and the hook containing bait 45 equal weight 21 when the trigger is balanced in a horizontal position. Weight 32 is optional. While a number of combinations of weights may be used, the hook and bait in a typical embodiment contribute about 0.25 oz., while the sum of weight 31 and 32 contribute between 2 and 5 oz. Weight 31 may be placed on the fishing line between the loop 44 and the bait 45, while weight 32 may be placed on the fishing line 27 between the loop 44 and the spool 22.

To make the trigger user-ready, the housing containing the device 10 is properly positioned over an opening in the ice 25 into which the fishing line would be lowered. If the housing contains a base 35, the opening in the base would be positioned over the opening 25 in the ice 37. The trigger 11 is then pivoted into a horizontal position with the side of the trigger 11 containing aperture 38 positioned adjacent to the first side 33. Next, the section of the fishing line 27 between the loop 44 is threaded and draped over the end of the trigger 11 containing the aperture 38 such that the trigger 11 achieves approximate horizontal balance and the end of the fishing line 27 is lowered into the opening in the ice 25. When a fish takes the bait, it pulls the loop 44 off the trigger 11 causing it to tip into its normal vertical position by weight 21.

To facilitate achieving this balance and ensure that it is not disturbed by winds or movements of the device, a flexible support 15 is inserted into the aperture 38 of the trigger 11. The flexible support 15 may be held by a rigid rod 14 attached to the top of the housing 19. The flexible support 15 must hold the trigger 11 in horizontal balance when it is set up in ready-to-use position, yet allow movement of the trigger 11 when a fish takes the bait. Suitable materials for the flexible support 15 include but are not limited to fabric or synthetic yarn, tissue paper and feather. The structure and the materials of construction for the flexible support must be sufficiently sturdy to support the trigger, but bend when the fishing line is released to allow the trigger 11 to return to its normal vertical posture to signal to the fisherman to turn the spool 22 and collect the fish.

Materials of construction for the device include but are not limited to metal, wood and plastic. The inside of the housing may contain a heat source 28 such as candles that provides sufficient heat to prevent the opening 25 in the ice 37 from freezing.

It should be understood, of course, that the foregoing relates to exemplary embodiments of the invention and that modifications may be made without departing from the spirit and scope of the invention.

I claim:

1. A device for signaling that a fish has taken bait comprising:
    a housing containing a top side, a front wall, a rear wall, a first side wall and a second side wall opposite to said first side wall, said top side wall comprising an elongated slot, said slot defining a front elongated side and a rear elongated side;
    a trigger having a first end and a second end, said trigger being pivotally attached at a center point of the trigger to a center point of the slot rear elongated side, said first end of the trigger containing an aperture, and the second end containing a weight, said weight being sufficient to cause said trigger to tip to a vertical position; and
    a fishing line woundable onto a spool attached to the top side, said spool being configured for free rotation, said fishing line having an end containing a bait, said fishing line also containing a first counterbalancing weight disposed at a first distance from the end of the fishing line and a second counterbalancing weight disposed at a second distance from the end of the fishing line, said second distance being larger than the first distance,
    said fishing line containing a loop between the first counterbalancing weight and the second counterbalancing weight, said loop being configured for looping and draping over the first end of the trigger in a manner that the end of the fishing line reaches a desired fishing distance when the trigger is balanced in a horizontal position.

2. The device of claim 1 further comprising a heat source for heating the housing.

3. The device of claim 1 further comprising a bottom containing an opening for the fishing line.

4. The device of claim 1 further comprising a fixed flexible support, said fixed flexible support being adapted for placement inside the aperture of first end of the trigger.

5. The device of claim 4, wherein the flexible support is a feather.

6. A method of utilizing a device for signaling that a fish has taken bait, said device comprising: a housing containing a top side, a front wall, a rear wall, a first side wall and a second side wall opposite to said first side wall, said top side wall comprising an elongated slot, said slot defining a front elongated side and a rear elongated side; a trigger having a first end and a second end, said trigger being pivotally attached at a center point of the trigger to a center point of the slot rear elongated side, said first end of the trigger containing an aperture, and the second end containing a weight, said weight being sufficient to cause said trigger to tip to a vertical position; and a fishing line woundable onto a spool attached to the top side, said spool being configured for free rotation, said fishing line having an end containing a bait, said fishing line also containing a first counterbalancing weight disposed at a first distance from the end of the fishing line and a second counterbalancing weight disposed at a second distance from the end of the fishing line, said second distance being larger than the first distance, said fishing line containing a loop between the first counterbalancing weight and the second counterbalancing weight, said loop being configured for looping and draping over the first end of the trigger in a manner that the end of the fishing line reaches a desired fishing distance when the trigger is balanced in a horizontal position, said device further comprising a fixed flexible support, said flexible support being adapted for placement inside the aperture of first end of the trigger said method comprising:
    positioning the device over an opening in an icy area of a river or lake;
    pivoting the trigger to a horizontal position;
    looping and draping the loop over the first end of the trigger in such a manner that the trigger is substantially balanced in a horizontal position and the end of the fishing line containing the bait reaches the desired water depth;
    inserting the flexible support inside the aperture of the first end of the trigger; and
    positioning the end of the fishing line into the opening in the icy area.

* * * * *